(12) United States Patent
Kimura et al.

(10) Patent No.: US 6,814,122 B2
(45) Date of Patent: Nov. 9, 2004

(54) RADIAL TIRE FORMING DEVICE

(75) Inventors: Minoru Kimura, Nagasaki-ken (JP);
Nobuhiko Irie, Nagasaki-ken (JP);
Yoshihiro Fukamachi, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 236 days.

(21) Appl. No.: 10/129,128

(22) PCT Filed: Dec. 13, 2000

(86) PCT No.: PCT/JP00/08785
§ 371 (c)(1),
(2), (4) Date: May 23, 2002

(87) PCT Pub. No.: WO01/43956
PCT Pub. Date: Jun. 21, 2001

(65) Prior Publication Data
US 2002/0179253 A1 Dec. 5, 2002

(30) Foreign Application Priority Data
Dec. 15, 1999 (JP) ............................................ 11-355242

(51) Int. Cl.$^7$ ................................................ B29D 30/32
(52) U.S. Cl. ........................ 156/396; 156/132; 156/398; 156/401
(58) Field of Search ................................. 156/401, 398, 156/402, 403, 396, 111, 406.2, 414, 421.4, 131, 132

(56) References Cited

U.S. PATENT DOCUMENTS

| | | | |
|---|---|---|---|
| 2,319,643 A | 5/1943 | Sternad et al. | |
| 2,715,931 A | * 8/1955 | Frazier | 156/132 |
| 2,878,856 A | 3/1959 | Pacciarini et al. | |
| 3,816,202 A | * 6/1974 | Stokes | 156/123 |
| 4,063,987 A | 12/1977 | Irie et al. | |
| 4,134,783 A | * 1/1979 | Appleby et al. | 156/396 |
| 4,230,517 A | 10/1980 | Enders | |
| 4,473,427 A | * 9/1984 | Irie | 156/396 |
| 4,685,992 A | 8/1987 | Irie | |
| 4,830,693 A | * 5/1989 | Okafuji et al. | 156/132 |
| 5,073,225 A | * 12/1991 | Schmitt et al. | 156/401 |
| 5,141,587 A | * 8/1992 | Sumiuchi et al. | 156/396 |
| 5,651,849 A | * 7/1997 | Pizzorno | 156/132 |

FOREIGN PATENT DOCUMENTS

| | | |
|---|---|---|
| DE | 39 10 886 A1 | 10/1989 |
| EP | 0 676 277 A2 | 10/1995 |
| EP | 0 747 207 A2 | 12/1996 |
| JP | 59-70548 | 4/1984 |
| JP | 2639713 | 5/1997 |

* cited by examiner

Primary Examiner—Geoffrey L. Knable
(74) Attorney, Agent, or Firm—Armstrong, Kratz, Quintos, Hanson & Brooks, LLP

(57) ABSTRACT

The present invention provides a radial tire forming apparatus capable of being applied to the formation of a carcass band having a large folding length. On a housing for a rollover device of the tire forming apparatus, a plurality of sets of straight rail bearers are fixed at appropriate places, so that a frame provided with rails is advanced toward or retreated from a second forming point on the carcass forming former side by a cylinder fixed to the housing. The diameter of a first rollover ring is slightly smaller than the diameter of a second rollover ring. When the rollover rings are brought closest to each other, the cylindrical portions of the rings enter and lap on each other.

3 Claims, 18 Drawing Sheets

RADIAL TIRE FORMING DEVICE

TECHNICAL FIELD

The present invention relates to an apparatus for forming a radial tire mounted on a passenger car or the like.

BACKGROUND ART

Methods forming a radial tire are broadly divided into two methods.

A first method is a method in which when an inner liner and a ply which constitute a carcass layer serving as a back cloth are assembled into a carcass band, the outer peripheral length thereof is larger than the outer peripheral length of a bead core, and the bead core is installed by decreasing the diameters (usually, referred to as ply down) of a bead core region and a bead core outside portion. A second method is a method in which the outer peripheral length of a carcass band, which is same as described above, is smaller than the inner peripheral length of the bead core, and the bead core is installed by increasing the diameter (usually, referred to as bead lock) of the bead core region.

The present invention relates to an improvement in the latter second method.

Further, the second tire forming method is classified into three methods (method A, method B1, and method B2). Of these three methods, method A is a method in which "after the bead core is installed on the carcass band, a portion between the bead cores are swelled into a toroidal shape, and then the carcass band (including a sidewall) in the outside end portion of both of the bead cores is folded and pressed so that the bead core is wrapped in the aforementioned toroidal carcass band", and a ring-shaped belt-tread structure, which is assembled in advance to the toroidal outer peripheral portion, is assembled, by which a green tire for radial tire is completed. This method is a forming method in which "the carcass band including the sidewall is folded".

Method B is a method in which "after the bead core is installed on the carcass band, a portion between the bead cores is slightly expanded into a cylindrical shape, and then the carcass band in the outside end portion of both of the bead cores is folded and pressed so that the bead core is wrapped in the aforementioned cylindrical carcass band", and a ring-shaped belt tread structure, which is assembled in advance, is assembled to the outer peripheral portion swelled into a toroidal shape, by which a green tire for radial tire is completed. Of method B, method B1 is a tire forming method in which the carcass band including the sidewall is folded, and method B2 is a tire forming method in which the carcass band not including the sidewall is folded and subsequently the sidewall is affixed.

In all of the above-described three methods, a tire construction called a tread over sidewall, in which the end portion of tread is provided so as to cover the outside of the end portion of sidewall, is used to improve the productivity.

In the case of such a construction, if the position in which the sidewall end is affixed is inexact relative to the end position of belt layer, the durability and quality of tire is seriously affected.

In the conventional forming machine of method A, (I) A rubber bag called a bladder is used for folding, and careful attention is paid to the performance and quality control of bladder and the operation control of equipment for the above-described reasons. However, great swelling occurs from a portion near the bead diameter of tire to a position near the outside diameter of tire, and the dimensions inevitably change with use. Therefore, it is difficult to make the degree of swell of right and left bladders uniform and to stabilize the slip of bladder surface.

(II) Further, taking notice of the behavior near the end of pressing of the member end portion (explanation is given in a portion at the left of the equator line of toroidal tire), there is a problem in that a member on the bladder having a curvature that is convex toward the right flies to the toroidal carcass having a curvature that is convex toward the left while rolling on the curvature while sliding on the bladder by means of the shrinkage force of member, by which the affixing position is made unstable.

Contrarily, in method B1, a single bladder is used for folding, and the amount of swell in the radial direction is regulated by the action of a rollover ring, so that the amount of swell is remarkably small. Therefore, the profile after the bladder has swelled is stable. Further, because of the folding action in which transfer is effected in the state in which the member is held between the bladder and the ring inside cylinder face, the profile is stable as compared with method A.

Contrarily, in method B2, after the folding work, the end portion of sidewall can be affixed with a projected bright line representing the affixing position to be controlled being the reference, the sidewall end portion on the tire equator line side has a high accuracy as compared with method B1.

The bladder used for folding is classified into a single bladder type and a dual bladder type. The single bladder type is a type in which one bladder is used on one side of a forming drum. The dual bladder type is a type in which two bladders are used. For the single bladder type, in order to assist the folding action of the swelled bladder, a ring-shaped body called a "push can" or a "rollover ring" is indispensable.

For the folding in method B2, any of a rollover type using the single bladder, a push can type using the single bladder, and a dual bladder type can be used. The type to be used is determined by the length of folding and the construction and arrangement of forming equipment.

For the purpose of the improvement in high-speed durability, a tire having a two-layer construction of plies constituting the carcass has been needed.

As the two-layer construction, the following types have been considered. (Herein, a ply bonded to an inner liner layer in the cross section of a completed tire is called a first ply.)

(a) A type in which the two-layer construction is formed by laminating a ply with the same width as that of the first ply on the first ply so as to be slightly shifted in the axial direction of a forming former. In this case, the position of ply end folded while wrapping the bead core is almost the same as that of the tire of one-layer construction, and lies close to the bead core of sidewall.

(b) A type in which the two-layer construction is formed by laminating a ply with a width slightly narrower than that of the first ply on the first ply. In this case, the position of ply end is similar to that in item (a).

(c) A type in which the overall two-layer construction is formed by one ply by increasing the width of the first ply and by lapping the folded plies on each other at the tire equator position.

(d) A type in which the overall two-layer construction is formed by making the width of the first ply equal or approximately equal to the width of tire of one-layer construction and by adding a second ply extending to both end portions of the folded first ply.

(e) A type in which the substantial two-layer construction is formed by one ply by increasing the width of the first ply and by positioning the end portion of the folded ply slightly on the tire equator position side of the end portion of the belt layer.

(f) A type in which the two-layer construction is formed by making the width of the first ply equal or approximately equal to the width of tire of one-layer construction, by adding the second ply to the end portion of the first ply, and by positioning the end portion of the second ply slightly on the tire equator position side of the end portion of the belt layer.

When a tire of two-layer construction of each of these types is to be produced, in method A, The two-layer construction of items (a) and (b) can be formed.

The two-layer construction of item (c) cannot be formed because of a too large length of folding.

The two-layer construction of item (d) can be formed if the construction is such that the folded first ply is lapped on the second ply, but cannot be formed if the construction is such that the second ply is lapped over the folded first ply.

The two-layer construction of items (e) and (f) can be formed, but has a problem described below.

Since the folding length is large, the swell of bladder must be increased as compared with the above-described cases (I) and (II), and further there is added a new problem in that since the folded ply end is longer than the sidewall end, when the member flies to the toroidal carcass as described in case (II), the end portion of ply only has a higher shrinkage speed than the lamination region of sidewall and ply, so that there arises a problem in that the affixing position becomes more unstable.

In method B, for the push can type and dual bladder type, of the above-described constructions, only the constructions of items (a) and (b) can be formed. In methods B1 and B2 using the rollover ring, the constructions of items (a) to (f) can be formed without being affected by the folding length.

As forming equipment of method B, forming equipment disclosed in Japanese Patent Publication No. 53-24463 is publicly known, but this forming equipment has the following problems.

(1) According to this invention, "a step of forming a cylindrical tire band to which a bead member is assembled on a tire forming drum and a step of folding both end portions of the tire band around the bead member after the diameter of the drum is increased and then affixing a tire sidewall constructing member to form a green case" are implemented on the same drum. The publicly know drum capable of being used in such steps has a bladder that wraps the bead core, so that the surface thereof is not flat, which interferes with the exact winding of thin-wall inner liner and ply.

(2) As described above, the bladder used for folding is classified into the single bladder type and the dual bladder type. The single bladder type is a type in which one bladder is used on one side of the forming drum. The dual bladder type is a type in which two bladder is used.

For the single bladder type, in order to assist the folding action of the swelled bladder, the ring-shaped body called the "push can" or the "rollover ring" is indispensable. In this invention, however, consideration is not given to the action and arrangement of this ring-shaped body, so that the dual bladder type must inevitably be used.

As a result, this invention is unsuitable to the formation of a tire of a construction in which the folding length is large in folding a band at both sides of the bead core (the aforementioned items (c), (d), (e) and (f)).

DISCLOSURE OF THE INVENTION

The present invention has been made in view of the above situation. Accordingly, an object of the present invention is to provide a radial tire forming apparatus in which when a thin-wall inner liner and a ply are assembled, the stiffness is high, and these materials can be wound exactly and pressed firmly on a flat surface. Another object of the present invention is to provide a radial tire forming apparatus provided with a folding device that can be applied to the formation of a carcass band having a large folding length, especially, a tire constructed so that the fold end portions are lapped on each other at the tire equator position.

To achieve the above objects, the present invention provides tire forming equipment including a first forming process including a carcass band forming process in which a dedicated forming former for forming a carcass band is provided at a first forming point A, and an inner liner and a ply are laminated on the band forming former provided with a flat and stiff forming surface, by which a carcass band with an outside diameter smaller than the inside diameter of a bead core is formed; a carcass forming process including a carcass forming former with a diameter smaller than the inside diameter of carcass band and rollover work (work for folding and wrapping the bead core) at a second forming point C; and a carcass band conveying process for reciprocating the carcass band between these two processes; a second forming process in which a sidewall is wound on the carcass structure having been completed by the first forming process at a third forming point E to complete a green case; and a third forming process for assembling a belt-tread structure after the green case is made in a toroidal shape at a fourth forming point, including a green case conveying process for receiving the green case at the third forming point E and delivering it at the fourth point H; a belt-tread structure forming process for forming the belt-tread structure at a fifth forming point I; and a belt-tread structure conveying process for conveying the belt-tread structure from the fifth forming point I to the fourth forming point H. Thus, during the time when the carcass forming former 11 moves from the second forming point C to the third forming point E, the rollover work is performed.

Also, the present invention is preferably configured so that the rollover device is constructed as described below. The rollover device includes a frame moving longitudinally toward the former on guide rails disposed in parallel with the forming former axis of the carcass forming process; a driving unit for the frame; a guide shaft capable of moving longitudinally on the frame toward the former disposed in parallel with the forming former axis; a thin-wall, ring-shaped first rollover ring which is fixed at the end of the former side of the guide shaft and is disposed coaxially with the former axis; and a thin-wall, ring-shaped second rollover ring which is mounted so as to be movable on the guide axis and is disposed coaxially with the former axis, and the rollover device is constructed so that the first and second rollover rings can be moved individually and synchronously. Also, the rollover device is constructed so that the rollover device is mounted in a housing portion for supporting the former, which is constructed so that the carcass forming former reciprocates between the second forming point and the third forming point, so that the operation of rollover ring can be performed even during the movement of the carcass forming former.

Also, in the radial tire forming apparatus in accordance with the present invention, for a tire constructed so that the fold end portions of carcass band are lapped on each other, when the first rollover ring and second rollover ring are brought close to the center of the forming former, in the first half of approaching operation, the rollover rings are brought close to the forming former synchronously and are stopped once at a respective "first advance stop position", and in the second half of operation, either one of the rollover rings is advanced to a "second advance stop position (work finish position)", and at an appropriate time during the retreat, the other rollover ring is advanced to the "second advance stop position" of that rollover ring, by which rollover work can be performed alternately.

Further, in the radial tire forming apparatus in accordance with the present invention, the diameters of the rollover rings are different from each other so that when the first rollover ring and second rollover ring are brought closest to each other, the cylindrical portions of the rings enter and lap on each other, by which the size of the equipment of carcass forming process is decreased.

BEST MODE FOR CARRYING OUT THE INVENTION

A radial tire forming apparatus in accordance with an embodiment of the present invention will now be described with reference to the accompanying drawings.

Figure 1:
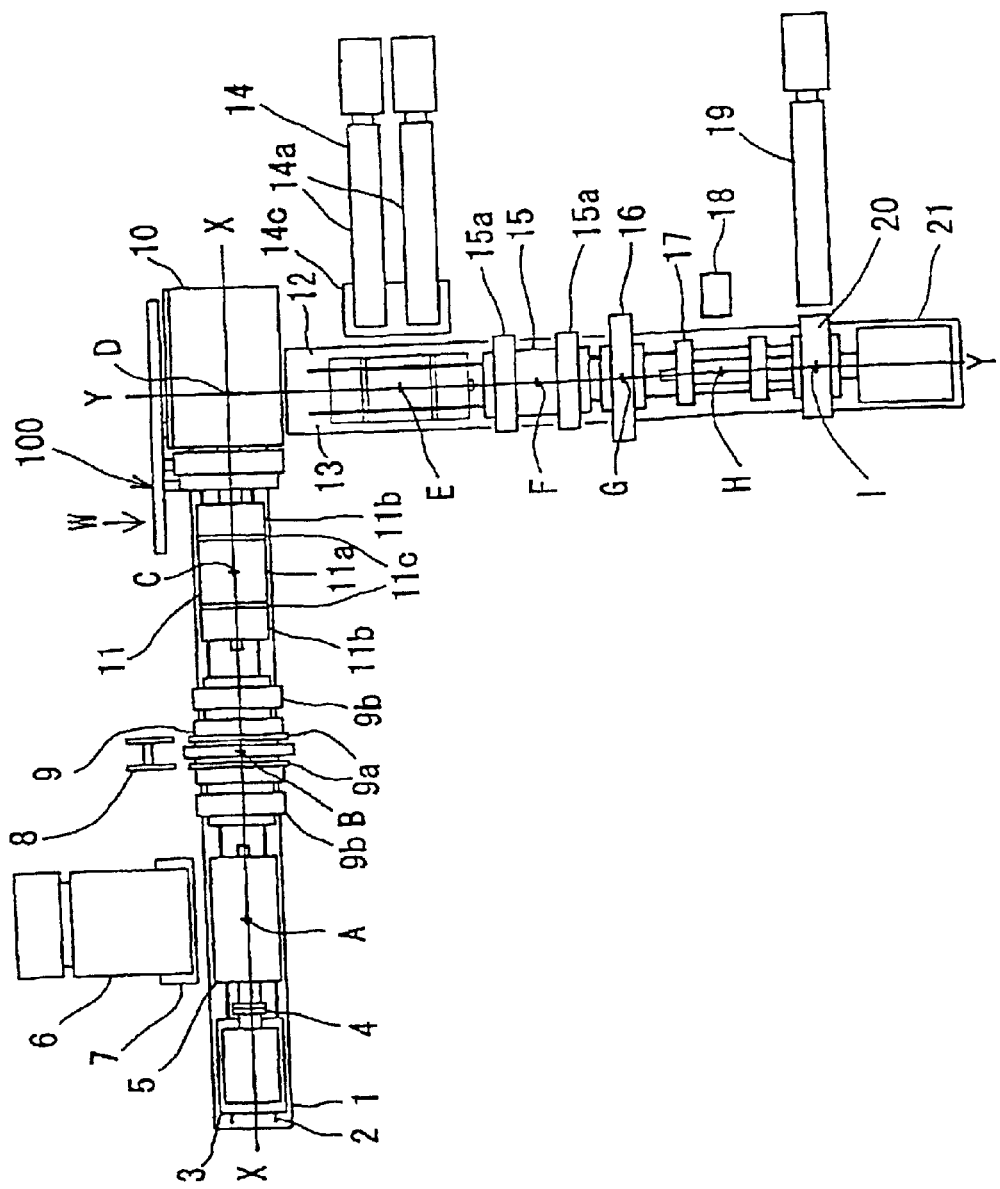
FIG. 1 is a plan view showing the whole of a radial tire forming apparatus in accordance with an embodiment of the present invention.

In FIG. 1, the X—X axis represents an axis of a carcass band forming former 5 and a carcass forming former 11 in a first forming process, and the Y—Y axis represents an axis of a shaping former 17 and a forming former 20 in second and third forming processes. In addition to the aforementioned forming formers 5 and 11, a carcass band carrier 9 is arranged so that the axis thereof coincides with the X—X axis. The carcass band forming former 5 is capable of being expanded and contracted, and takes a substantially cylindrical shape at the time of forming. It is installed on a shaft 4 mounted rotatably to a moving housing 3, and is constructed so as to move between a first forming point A and a point B which is a standby point of the carcass band carrier 9 and a delivery point of carcass band on rails 2 provided on a bed 1.

At the first forming point A, an inner liner and a ply fed from a material supply device 6 are wound on the carcass forming former 5, and are pressed and formed by a pressing device 7. The carcass band carrier 9 moves between the delivery point B and a second forming point C on the rails 2 provided on the bed 1.

The carrier 9 is made up of a pair of right and left bead holding devices 9a capable of being expanded and contracted, which receives a bead core fed from a position other than the X—X axis by a bead supply device 8 so that the center of the bead core coincides with the X—X axis, and a pair of right and left band holding devices 9b capable of being expanded and contracted, which holds both end portions of a carcass band received from the forming former 5 at the delivery point B.

The X—X axis of the first forming process is configured so as to coincide with the Y—Y axis by being turned around a point D. The housing 10 is reciprocated between the second forming point C on the X—X axis and a third forming point E on the Y—Y axis by being turned. At the third forming point E in the second forming process, a sidewall, which is delivered in the direction perpendicular to the Y—Y axis, is wound on the outside of a carcass structure.

A servicer 14 disposed opposingly at the third fanning point E has a pair of right and left sidewall conveyers 14a. Also, the servicer 14 is provided with a device 14c for pressing the wound sidewall.

In the third forming process, a green case carrier 15, having a pair of right and left green case holding devices 15a, performs operation such that it moves on rails 13 provided on a bed 12, is on standby at a point F, receives a green case at the third forming point E, and delivers it to the shaping former 17 at a fourth forming point H.

A belt-tread structure carrier 16 performs operation such that it receives a belt-tread structure having been assembled on the forming former 20 capable of being expanded and contracted, and delivers the belt-tread structure to the outside of the green case having been formed into a toroidal shape by the shaping former 17. The shaping former 17 and the forming former 20 are mounted coaxially in a housing 21. Reference numeral 18 denotes a pressing device for the carcass structure and the belt-tread structure, and 19 denotes a belt/tread supply device.

Figure 2:
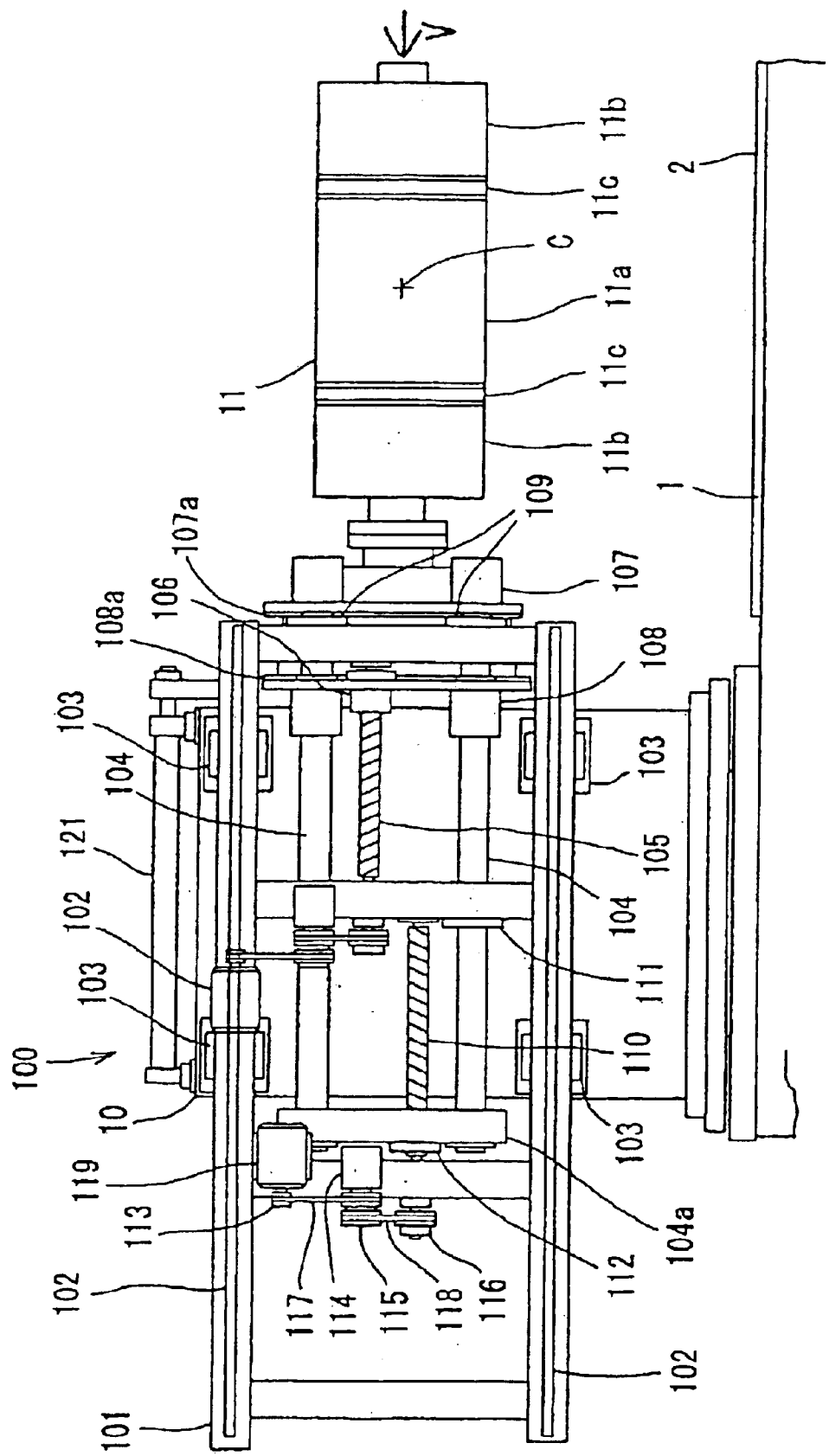
FIG. 2 is a side view showing a rollover device of the radial tire forming apparatus, which is taken in the direction of the arrow W in FIG. 1.
Figure 3:
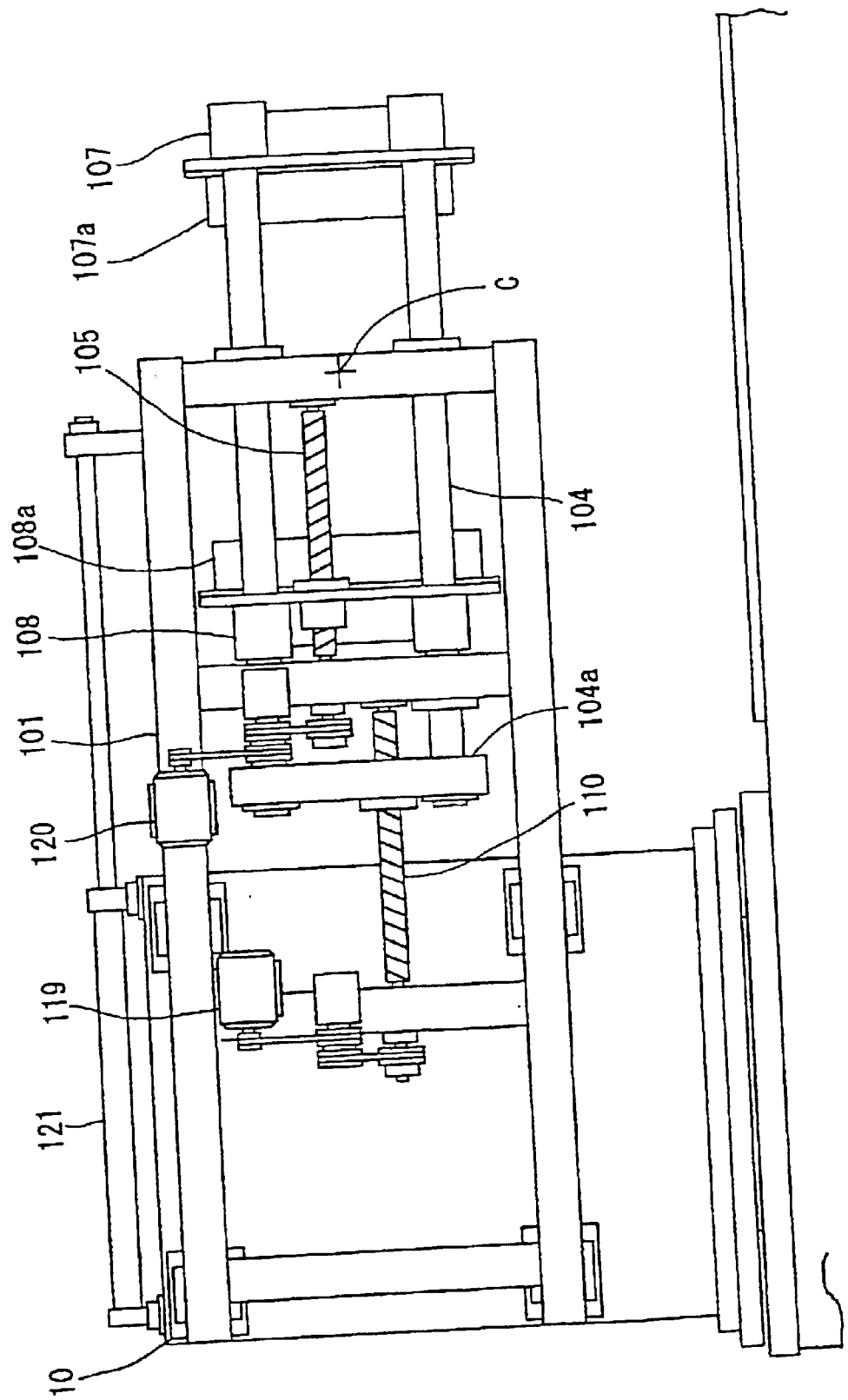
FIG. 3 is a side view showing a preparatory state in which the whole of a rollover device shown in FIG. 1 advances to start rollover work, in which a carcass forming former is omitted for visibility of main construction, and only the center of former is shown.
Figure 4:
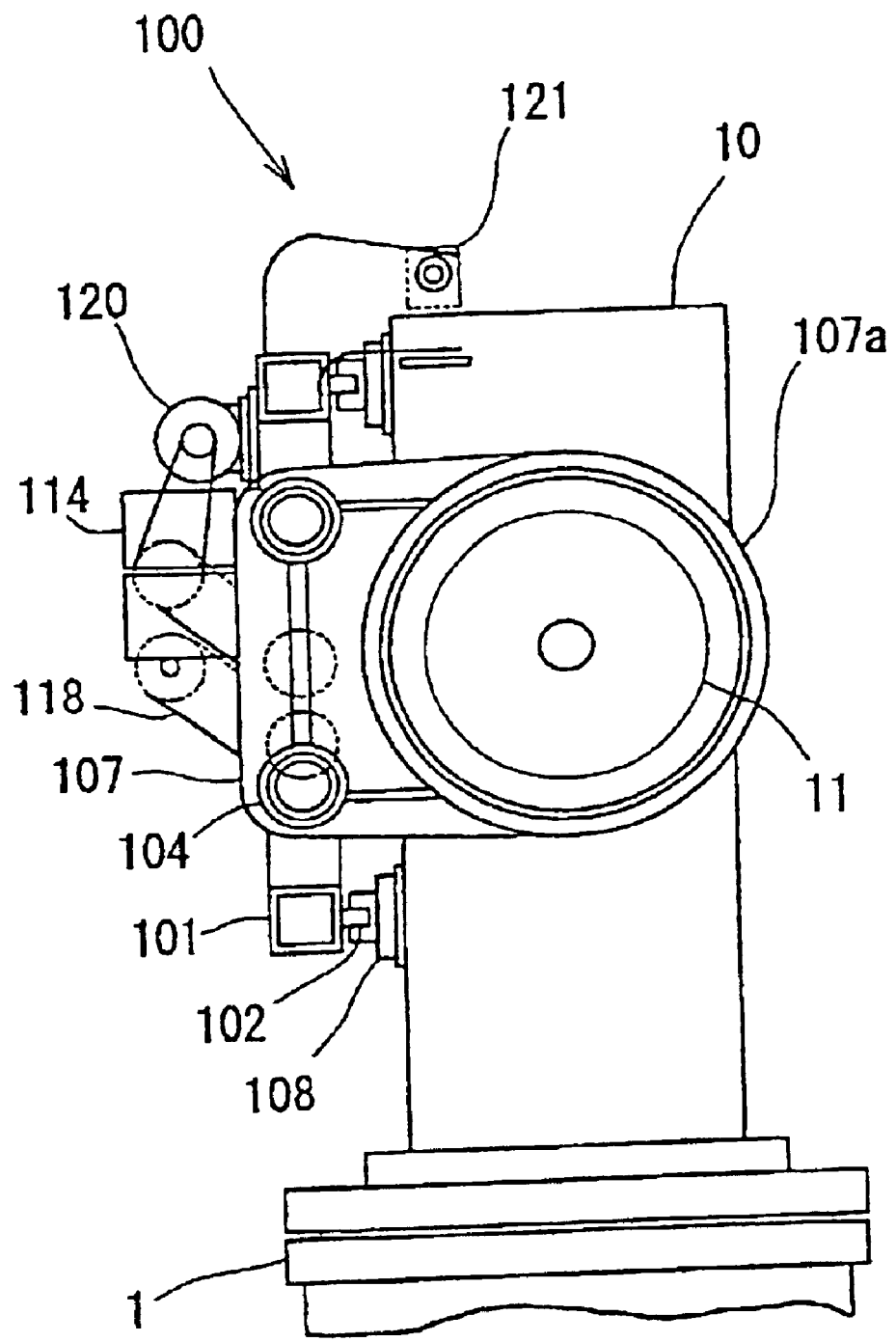
FIG. 4 is a front view of a rollover device shown in FIG. 1.

FIGS. 2 and 3 show the details of the rollover device 100 shown in FIG. 1, the views being taken in the direction of the arrow W in FIG. 1, and FIG. 4 is a view taken along in the direction of the arow V in FIG. 2. On the housing 10, a plurality of sets of straight rail bearers 103 are fixed at appropriate places, and a frame 101 provided with rails 102 disposed in parallel with the X—X axis is advanced toward or retreated from the second farming point C on the carcass fanning former side by a cylinder 121 fixed to the housing 10.

FIG. 2 shows a state in which a first rollover ring 107*a* and a second rollover ring 108*a* are closest to each other at the retreat limit, and FIG. 3 shows a state in which the first rollover ring 107*a* and the second rollover ring 108*a* are separated farthest at the advance limit.

The diameter of the first rollover ring 107*a* is slightly smaller than the diameter of the second rollover ring 108*a*. As shown in FIG. 2, when the rollover rings 107*a* and 108*a* come closest to each other, the cylindrical portions of the rings enter and lap on each other. By making the diameters of rollover rings slightly different from each other, the size of equipment for the carcass forming process can be decreased.

The first rollover ring 107*a* is installed to a first bracket 107. The bracket 107 is fixed to the end portion of guide shafts 104 disposed in parallel with the rails 102 of the frame 101. The guide shafts 104 are guided by front bearings 109 and rear bearings 111 mounted at appropriate places of the frame 101, and are moved longitudinally by being driven by a feed screw rod 110 engaged threadedly with a nut 112 fixed at an appropriate place of a connection beam 104*a* at the rear end of the guide shaft 104.

The feed screw rod 110 is driven by an output pulley 113 of a motor 119 fixed to the frame 101, an intermediate bearing box 114, an intermediate pulley 115, a pulley 116 at the end of the screw rod 110, and driving belts 117 and 118 that connect the pulleys. The second rollover ring 108*a* is installed to a second bracket 108, and the bracket 108 slides on the guide shaft 104, and further is moved longitudinally by being driven by a feed screw rod 105 engaged threadedly with a nut 106 fixed at an appropriate place of the bracket 108.

The feed screw rod 105 is driven by a motor 120, like the feed screw rod 110. According to the rollover device 100 constructed as described above, the individual operation and synchronous operation of the first rollover ring 107*a* and the second rollover ring 108*a* can be performed freely, and also even when the forming former 11 is moving from the second forming point C to the third forming point E, the operation of rollover ring can be performed, so that work can be done efficiently.

The following is a description of the operation of the radial tire forming apparatus in accordance with the embodiment of the present invention.

1. The carcass band forming former 5 is expanded so as to have a diameter suitable to the winding of material, and an inner liner and a ply which are fed from the material supply device 6 are wound, and are pressed by the pressing device 7. The winding diameter has been determined so that the outside diameter of the carcass band completed on the former is slightly smaller than the inside periphery diameter of bead core.

During this time, the bead supply device 8 delivers a bead core to the bead holding devices 9*b* of the carrier 9 at the standby position B. Also, after the delivery, the bead holding devices 9*b* move so that the clearance of the held bead cores becomes the clearance at the time when the bead core is received by the forming former 11.

2. After the press forming is finished, the carcass band forming former 5 moves from the first forming point A to the delivery point B, and stops on the inside of bead core having been held in advance so as to be coaxial.

3. After the stopping, the forming former 5 is expanded slightly, and presses the carcass band on the inner peripheral surface of bead core.

4. After the band holding device 9*b* of the carrier 9 holds the band end portion on the outside of bead core, the forming former 5 is contracted, delivers the carcass band having been completed on the former to the carrier 9, and returns to the forming point A to repeat the operations from item 1.

5. If preparation for receiving the carcass band forming former 5 at the second forming point C is finished (the forming former is contracted so as to be smaller than the inside diameter of carcass band and have a predetermined bead clearance), the carrier 9 moves to the second forming point C and stops.

6. After the stopping, the bead lock segments 11*c* are expanded to hold a carcass band-band structure, and then the holding of the carrier 9 is released, and the carrier 9 returns to the standby point B to repeat the bead core receiving operation and the following operations.

7. At an appropriate time after the movement of the carrier 9 to the standby point B has been started, the carcass forming former 11 expands the carcass band between the bead cores with the center former 11*a* being expanded while decreasing the clearance of the bead lock segments 11*c*. At almost the same time, the rollover device begins to advance, and stops at a position shown in FIG. 3.

For a tier of a construction such that the fold end portions of carcass band lap on each other, when the first rollover ring 107*a* and the second rollover ring 108*a* are brought close to the center side of forming former, in the first half of the approaching operation, the rollover rings 107*a* and 108*a* are brought close to the forming former synchronously and are stopped once at a respective "first advance stop position". In the second half of the operation, either one of the rollover rings is advanced to a "second advance stop position (work finish position)", and at an appropriate time during the retreat, the other rollover ring is advanced to the "second advance stop position" of that ring, by which rollover work is performed alternately.

8. At an appropriate time during the time when the carrier 9 waits at the standby point B, the forming former 11 may begin to move toward the third forming point E regardless of the state of the forming former 11 and the rollover device 100.

9. At the third forming point E, a sidewall is wound and press formed by the pressing device, by which a green case is completed.

During this time, the green case carrier 15 moves to the third forming point E, and starts the preparation for receiving the green case. After the formation of green case is finished, the carrier 15 holds the green case from the outside, the forming former 11 is contracted, and then the carrier 15 moves to the standby point F, by which the delivery of green case is finished. The forming former 11 having finished the delivery returns to the second forming point C to repeat the operation in item 5 and the following operations.

10. In parallel with the operations at the first, second, and third forming points, at the fourth forming point H, after the green case is received from the carrier 15, both bead portions are held and an airtight condition is created. While the clearance between beads is decreased symmetrically with respect to the point H, compressed air is supplied and a cylindrical green case is formed into a toroidal shape.

11. Before the formation into a toroidal shape is finished, the belt-tread structure which has been completed on the forming former 20 is held by the carrier 16 from the outside, and stops on the outside of the green case at the forming point H. Finally, the toroidal top portion of green case is bonded to the inside of the belt-tread structure.

Subsequently, the carrier 16 releases the outside holding, and moves once to the standby position G to wait until the pressing work performed by the pressing device 18 is completed.

12. After the press forming, the carrier 16 moves again to the forming point H to hold the completed green tire from the outside.

While the inflate compressed air in the shaping former 17 is exhausted, the holding of bead portion is released, and therefore the carrier 16 conveys the green case to the standby point G. The outside holding is released with appropriate timing, and the green case is taken out of the Y—Y axis by a forming operator or using a device, not shown.

13. At a fifth forming point I, a belt material is laminated on the forming former 20, and then a tread material is wound and bonded, by which a belt-tread structure is prepared.

At an appropriate time, the carrier 16 moves from the standby point G to the forming point I, and holds the assembly from the outside. Then, the forming former 20 is contracted, and delivers the assembly to the carrier 16. During this time, at the forming point H, the delivery of green case by the carrier 15 is finished.

Next, the forming process at the time of turn-up will be described in more detail.

First, the forming process at the time of ordinary turn-up time will be described with reference to FIGS. 5 to 10.

Figure 5:
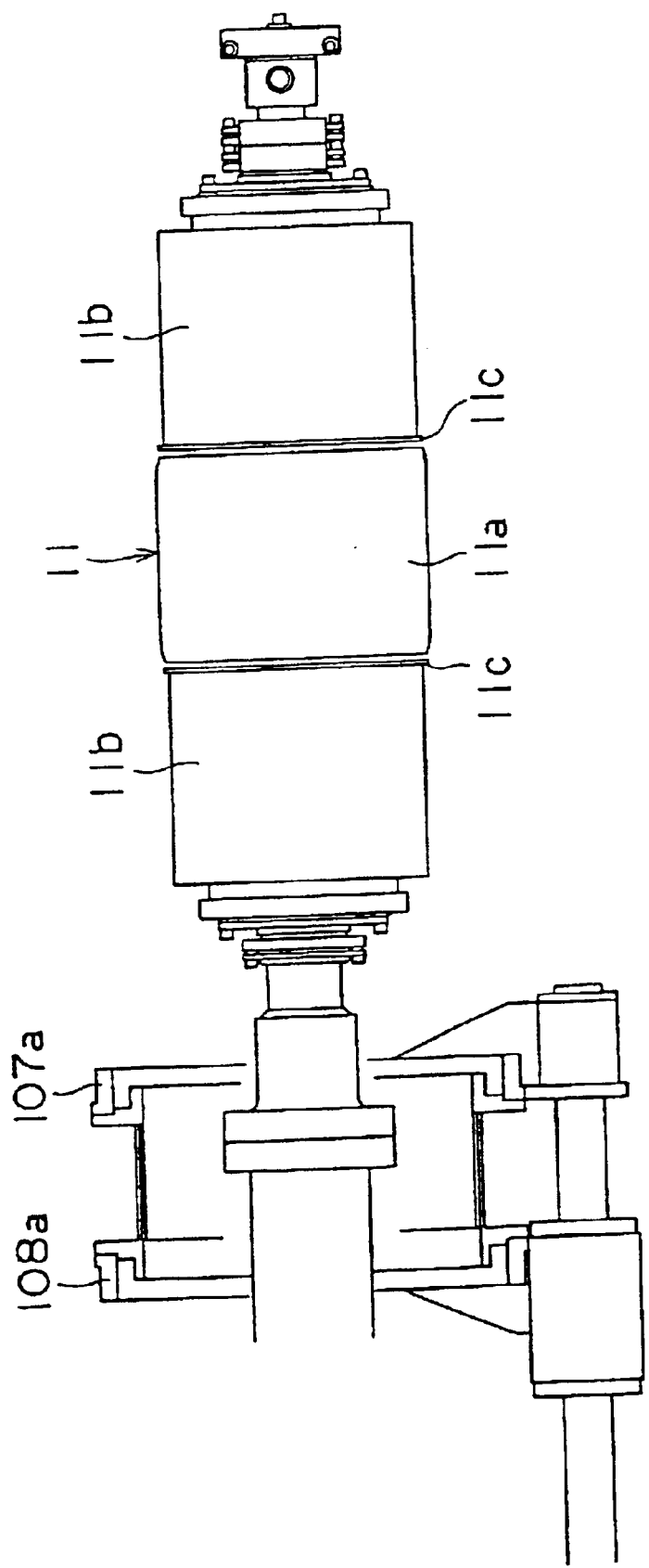
FIG. 5 is a side view showing a state in which a rollover ring is on standby at the base of a carcass forming former at the time of usual turn-up time.

FIG. 5 shows a state in which the first rollover ring 107a and the second rollover ring 108a are on standby. In this state, the first rollover ring 107a and the second rollover ring 108a lap on each other, and wait in a position near the base of the carcass forming former 11.

Figure 6:
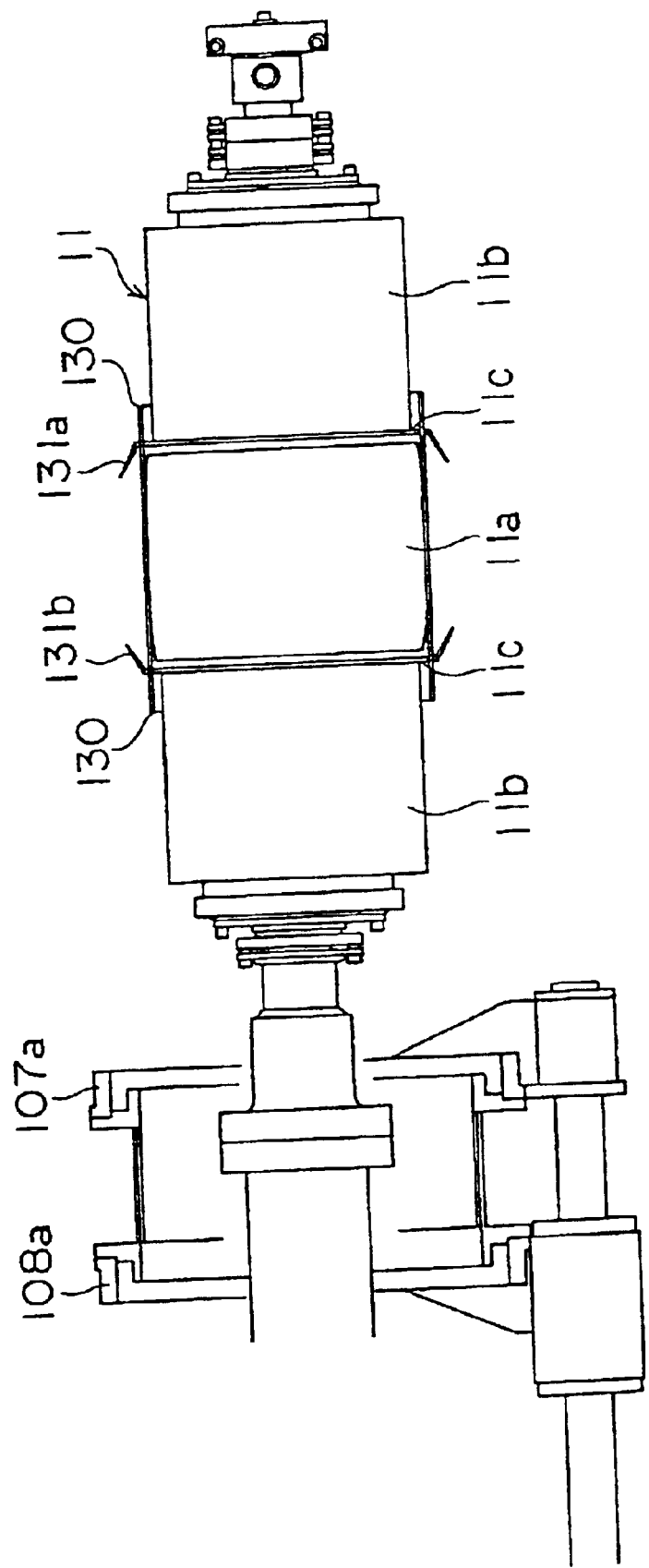
FIG. 6 is a side view showing a state in which a band and a ply are conveyed to a carcass forming former.

As shown in FIG. 6, with the first rollover ring 107a and the second rollover ring 108a being on standby, bands 130 having been formed by the carcass forming former 5 and beads 131a and 131b are conveyed onto the carcass forming former 11 at the same time by the carcass band carrier 9, and the beads 131a and 131b are locked by the bead lock segments 11c.

Figure 7:
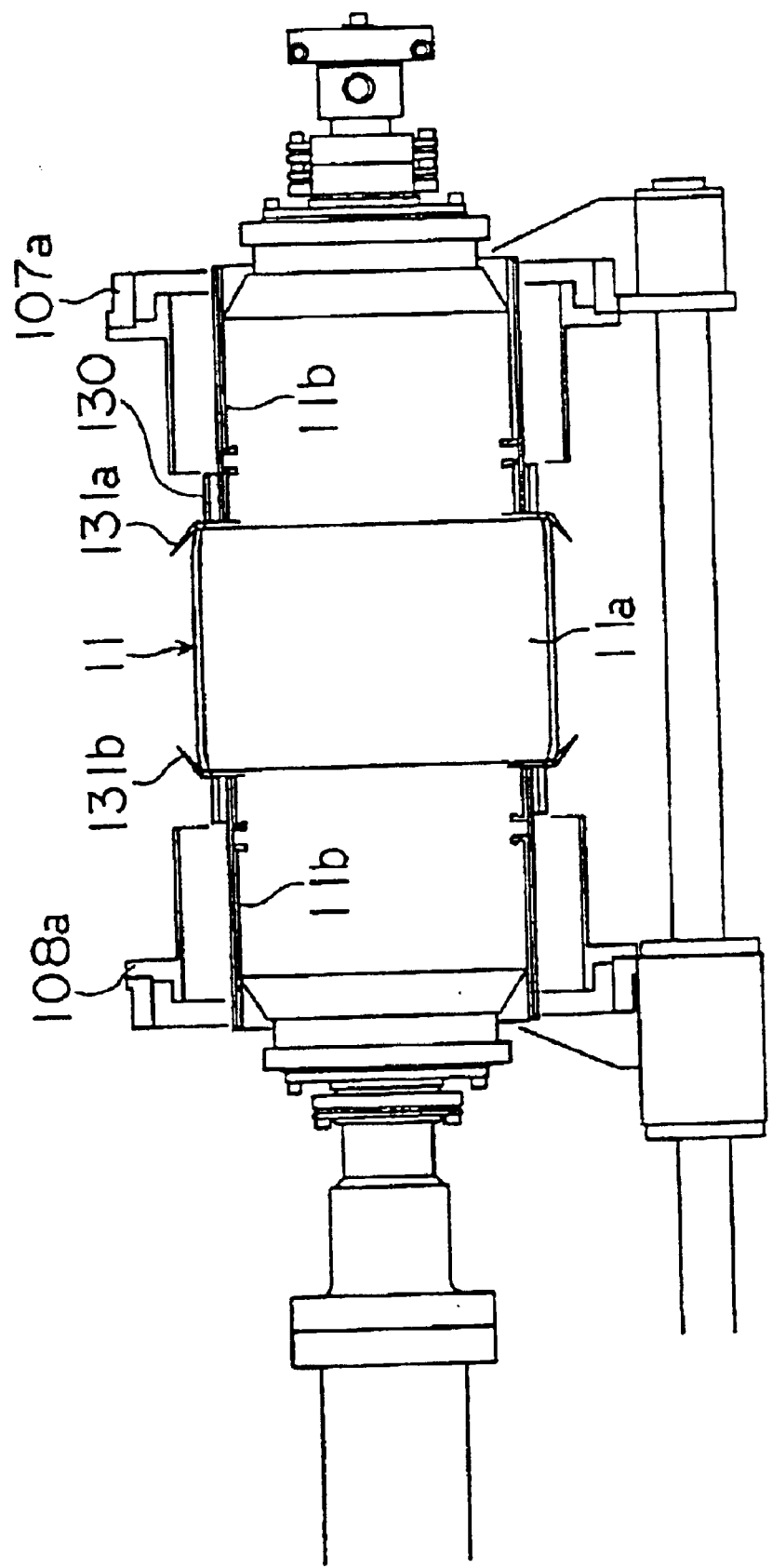
FIG. 7 is a side view showing a state in which a rollover ring is moved to a position of a turn-up bladder.

Next, as shown in FIG. 7, the first rollover ring 107a and the second rollover ring 108a are moved toward the carcass forming former 11. The first rollover ring 107a and the second rollover ring 108a are disposed in the positions of the turn-up bladders 11b of the carcass forming former 11 so as to hold the center former 11a therebetween.

Figure 8:
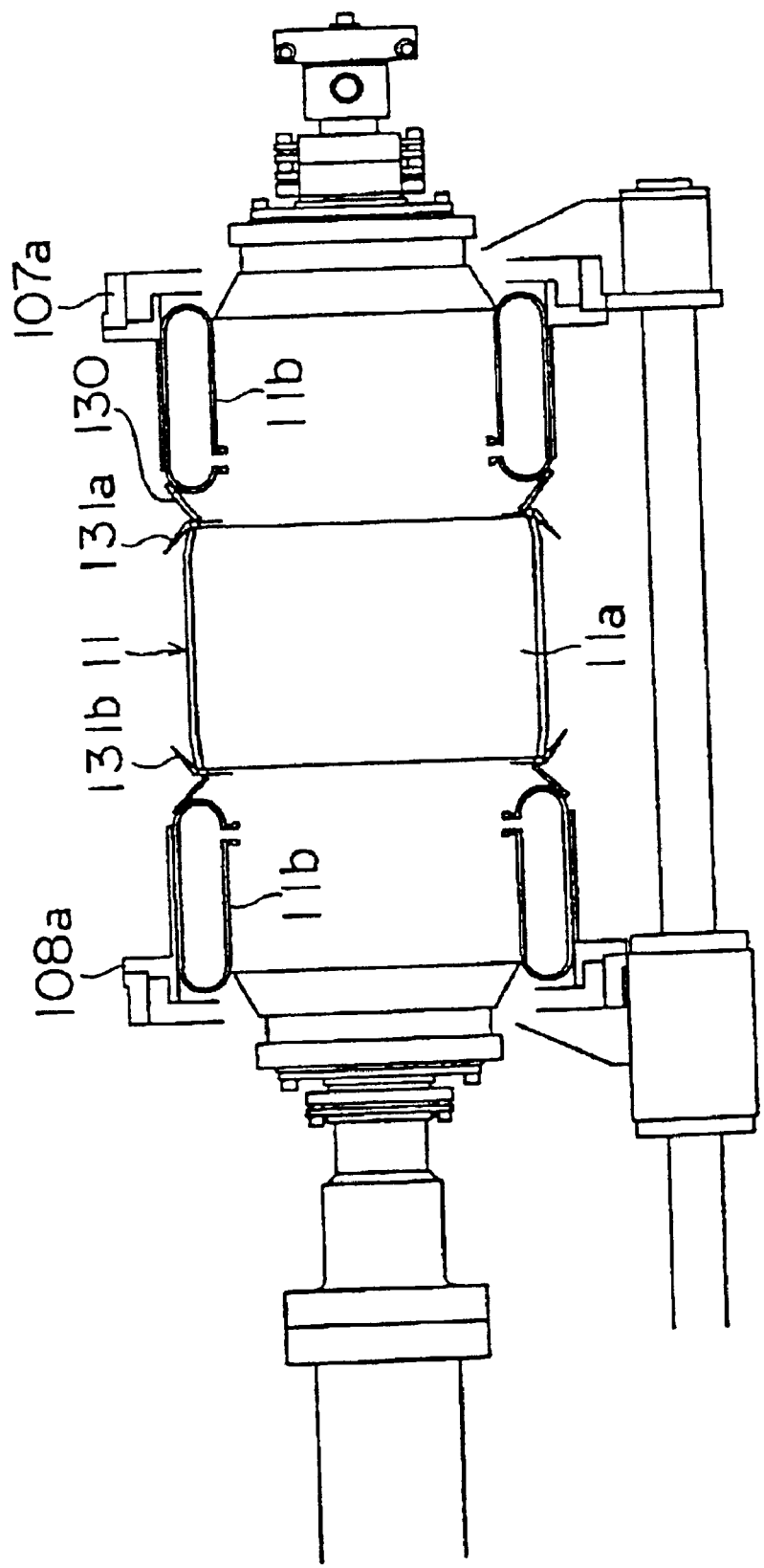
FIG. 8 is a side view showing a state in which compressed air is put into a turn-up bladder.

Each of the paired turn-up bladders 11b is swelled by the supply of compressed air, and comes into close contact with the inner peripheral face of the first rollover ring 107a and the second rollover ring 108a as shown in FIG. 8.

Figure 9:
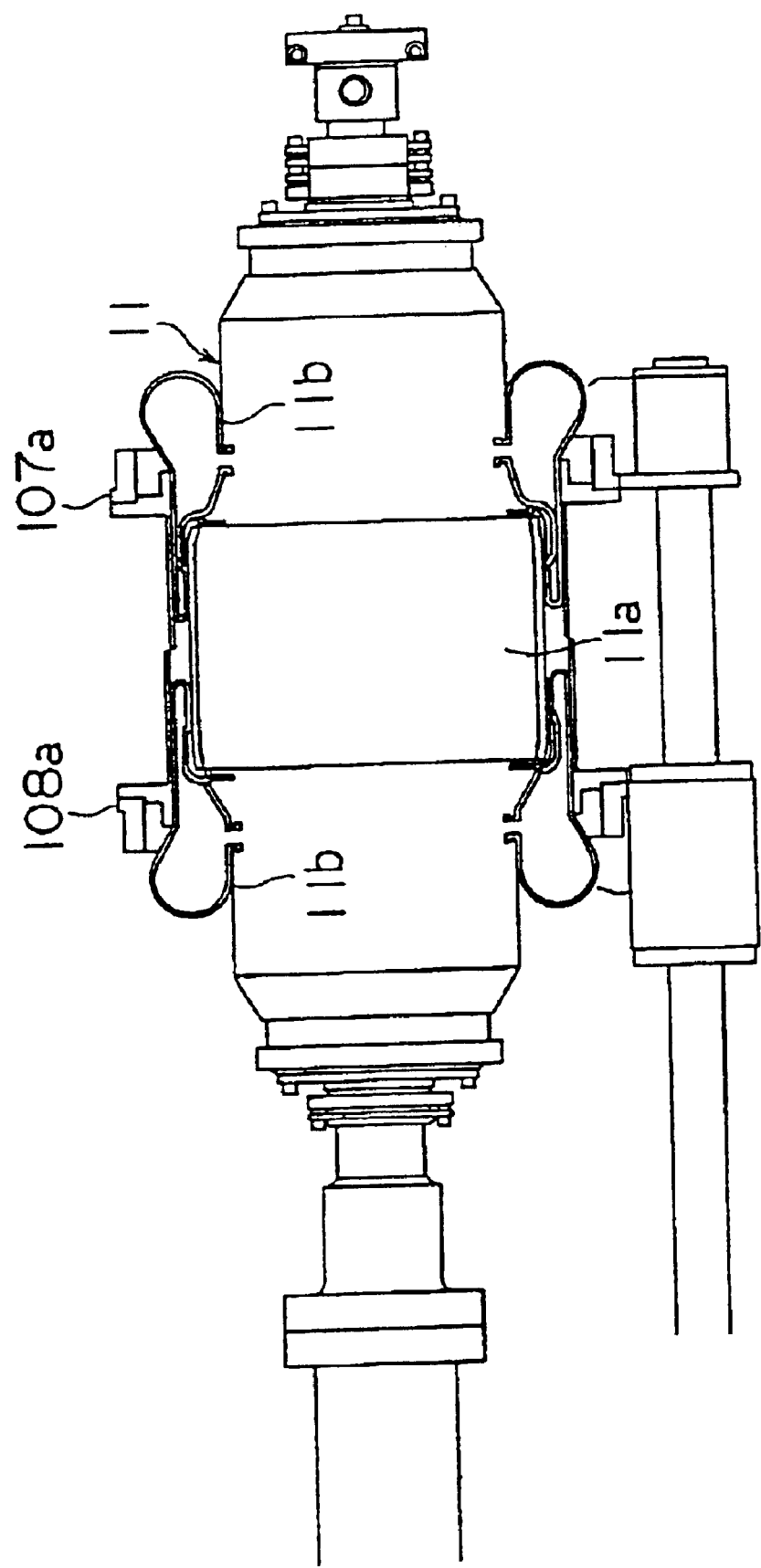
FIG. 9 is a side view showing a state in which a rollover ring is moved toward a center former.

In this state, the first rollover ring 107a and the second rollover ring 108a move at the same time in the direction such that they come close to each other, that is, toward the center former 11a of the carcass forming former 11 as shown in FIG. 9. At this time, the turn-up bladder 11b rolls along with the movement of the ring. Thereby, the band end is wound around the bead.

Figure 10:
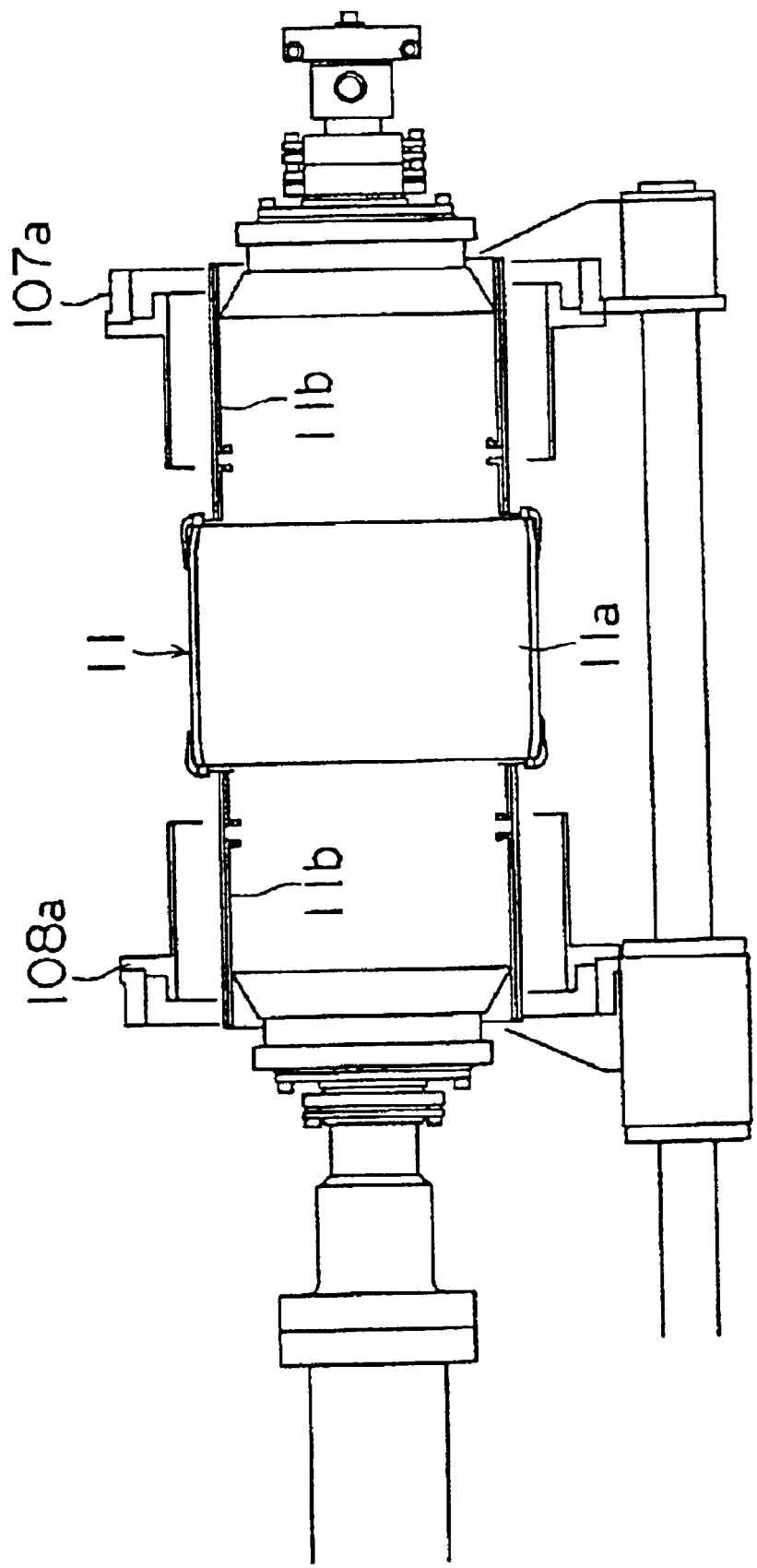
FIG. 10 is a side view showing a state in which air in a turn-up bladder is exhausted, and a rollover ring is returned to a position before turn-up.

Thereafter, as shown in FIG. 10, the air in the turn-up bladder 11b is exhausted, by which the turn-up bladder 11b is contracted and is returned to the original shape, and the first rollover ring 107a and the second rollover ring 108a return to the previous positions. Subsequently, the first rollover ring 107a and the second rollover ring 108a return to the standby positions, returning to the state shown in FIG. 5. Thus, the turn-up is finished.

Next, the turn-up forming process in the case where the width of the first ply is increased, and folded plies are lapped on each other at the tire equator position will be described with reference to FIGS. 11 to 18.

Figure 11:
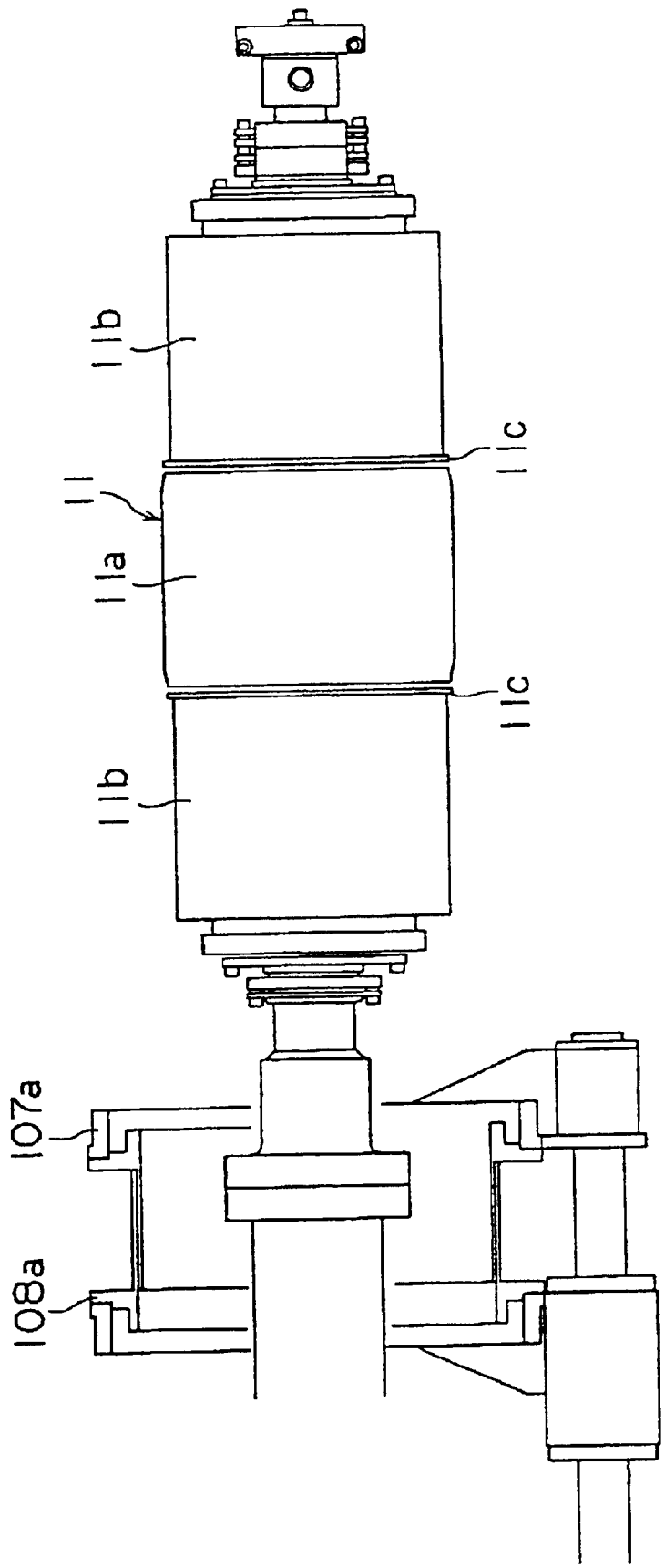
FIG. 11 is a side view showing a state in which a rollover ring is on standby at the base of a carcass forming former at the time of turn-up in the case where plies are lapped on each other at the tire equator position.

FIG. 11 shows a state in which the first rollover ring 107a and the second rollover ring 108a are on standby. In this state, the first rollover ring 107a and the second rollover ring 108a lap on each other, and wait in a position near the base of the carcass forming former 11.

Figure 12:
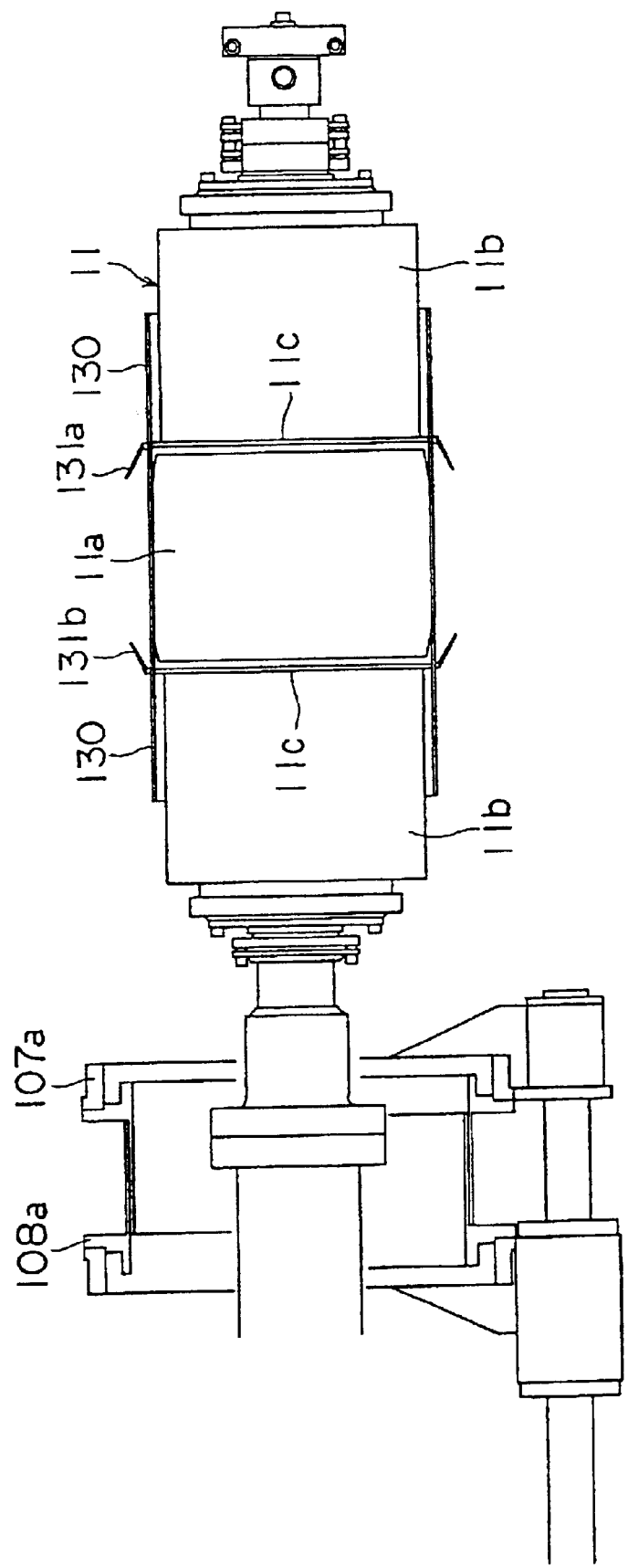
FIG. 12 is a side view showing a state in which a band and a ply are conveyed to a carcass forming former.

As shown in FIG. 12, while the standby state of the first rollover ring 107a and the second rollover ring 108a is maintained, bands 130 having been formed by the carcass forming former 5 and beads 131a and 131b are conveyed onto the carcass forming former 11 at the same time by the carcass band carrier 9, and the beads 131a and 131b are locked by the bead lock segments 11c.

Figure 13:
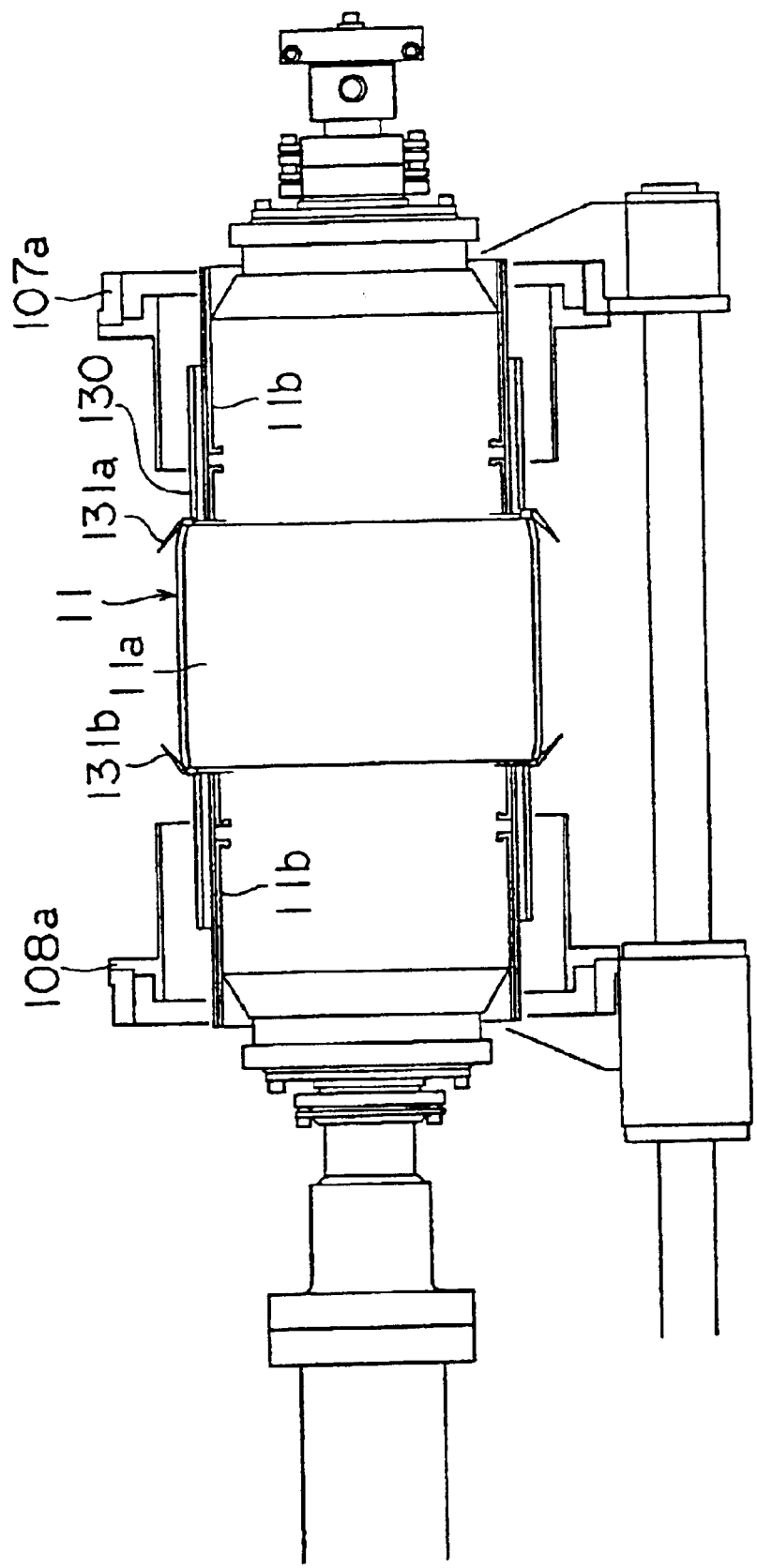
FIG. 13 is a side view showing a state in which a rollover ring is moved to a position of a turn-up bladder.

Next, as shown in FIG. 13, the first rollover ring 107a and the second rollover ring 108a are moved toward the carcass forming former 11. The first rollover ring 107a and the second rollover ring 108a are disposed in the positions of the turn-up bladders 11b of the carcass forming former 11 so as to hold the center former 11a therebetween.

Figure 14:
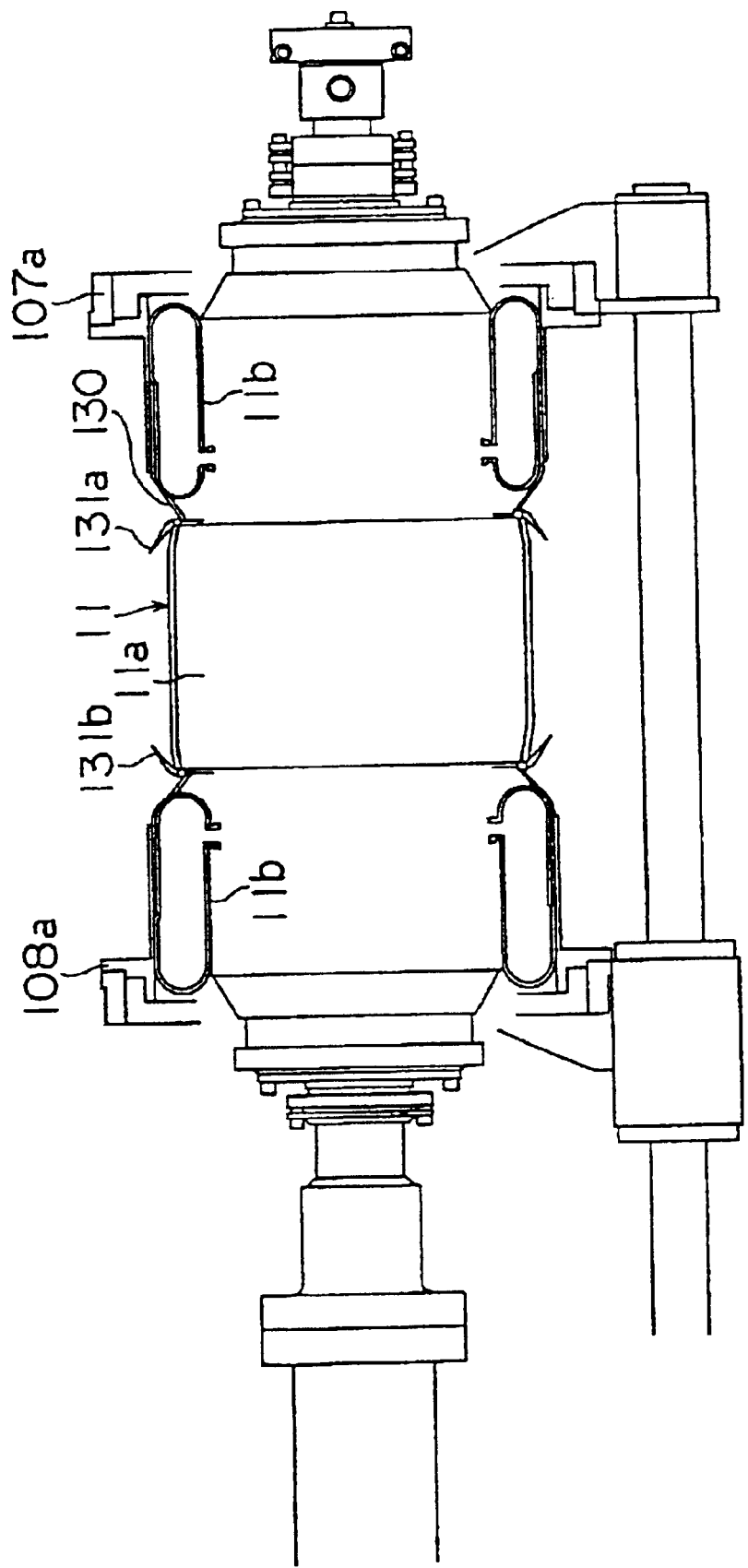
FIG. 14 is a side view showing a state in which compressed air is put into a turn-up bladder.

Each of the paired turn-up bladders 11b is swelled by the supply of compressed air, and comes into close contact with the inner peripheral face of the first rollover ring 107a and the second rollover ring 108a as shown in FIG. 14.

Figure 15:
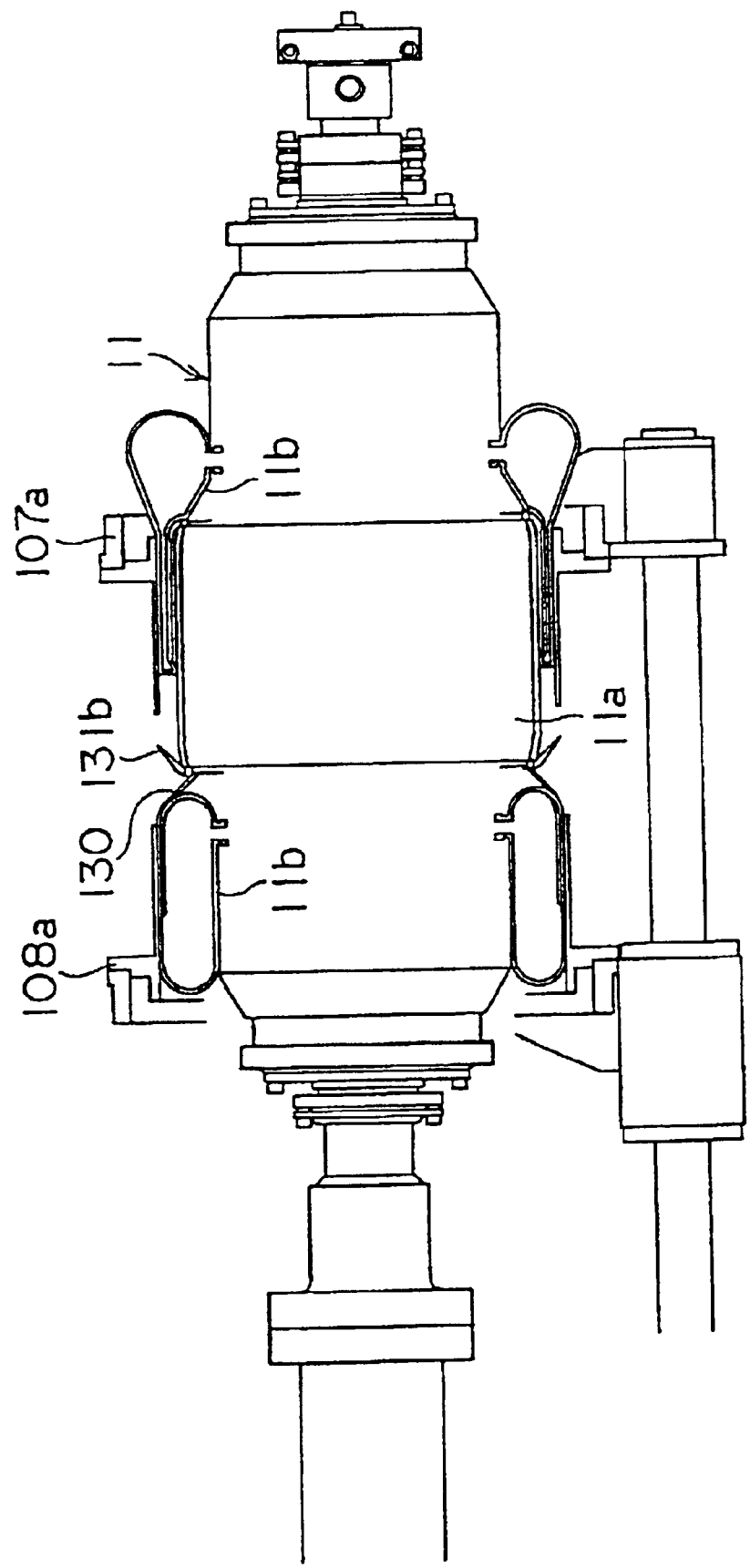
FIG. 15 is a side view showing a state in which one rollover ring is moved toward a center former.

From this state, as shown in FIG. 15, the first rollover ring 107a moves toward the center former 11a of the carcass forming former 11, and at this time, the turn-up bladder 11b rolls along with the movement of the ring. Thereby, the band end on the rollover ring 107a side is wound around the bead. Since the second rollover ring 108a does not advance at this time, the first rollover ring 107a can advance until the ply end is turned up completely beyond the equator.

Figure 16:
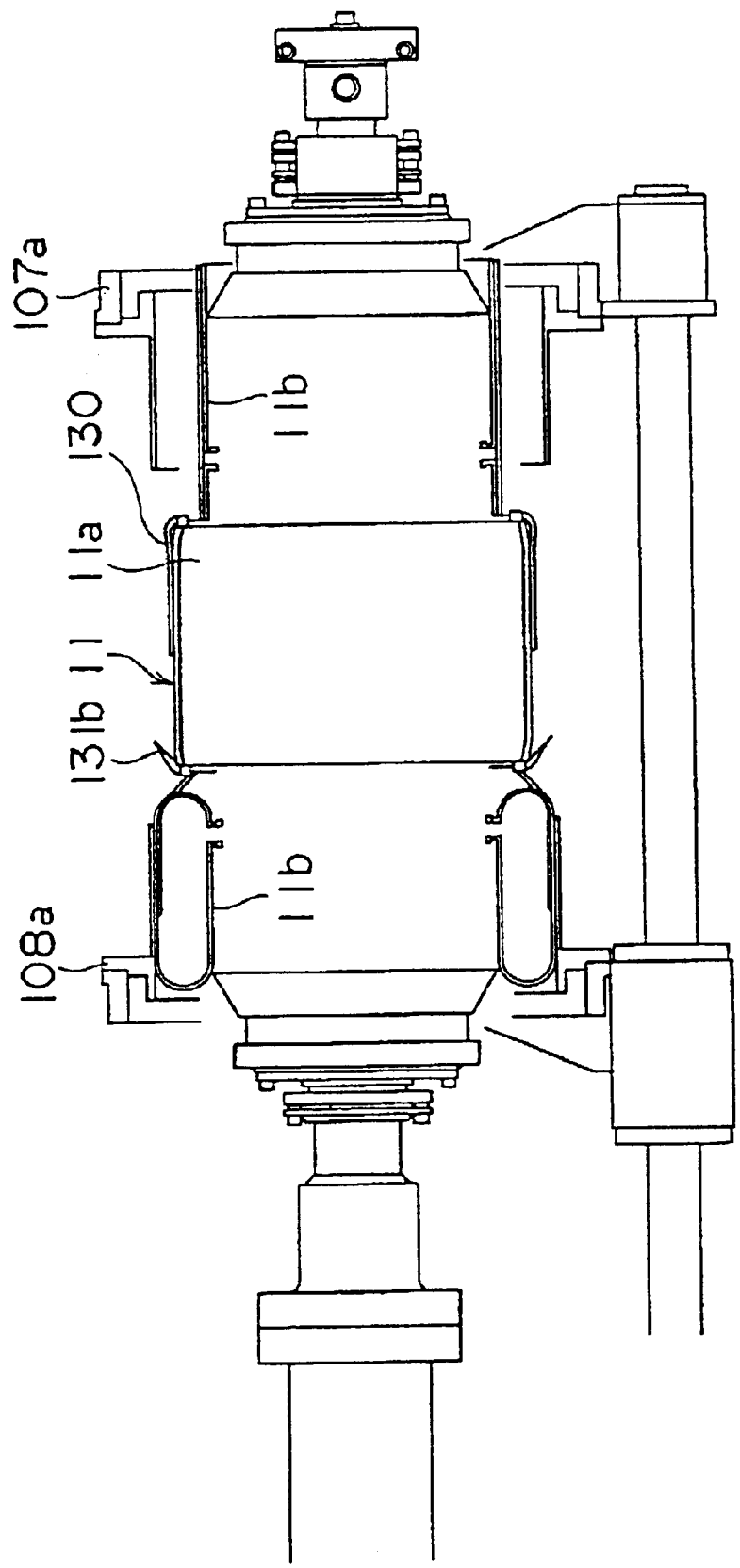
FIG. 16 is a side view showing a state in which one rollover ring is returned to a position before turn-up.

As shown in FIG. 16, the air in the turn-up bladder 11b on the first rollover ring side is exhausted, by which the turn-up bladder 11b is contracted and is returned to the original shape, and the first rollover ring 107a returns to the previous position.

Figure 17:
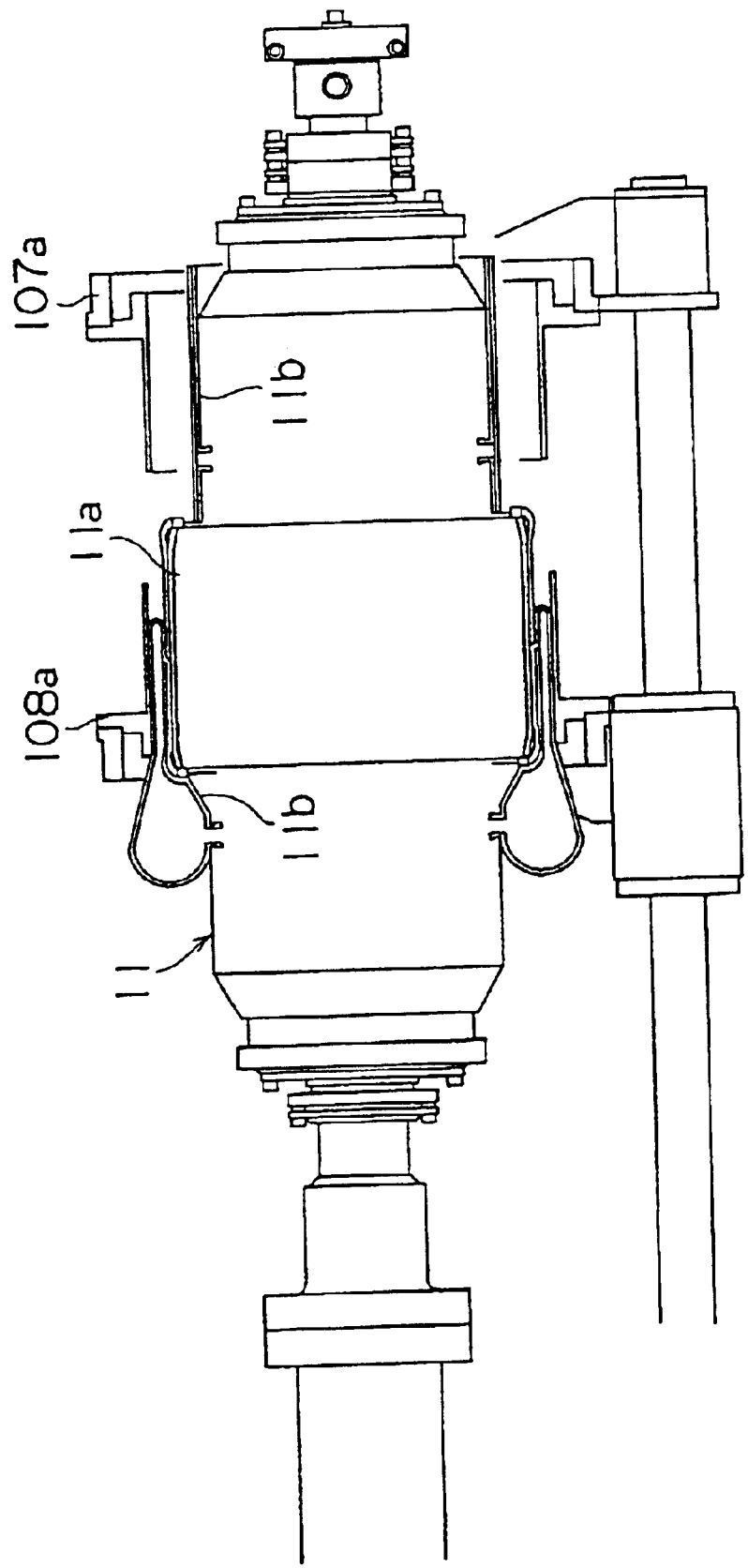
FIG. 17 is a side view showing a state in which the other rollover ring is moved toward a center former.

Subsequently, as shown in FIG. 17, the second rollover ring 108a moves toward the center former 11a of the carcass forming former 11, and the band end on the rollover ring 108a side is wound around the bead. As in the case of the first rollover ring 107a, the second rollover ring 108a advances until the ply end is turned up completely beyond the equator.

Figure 18:
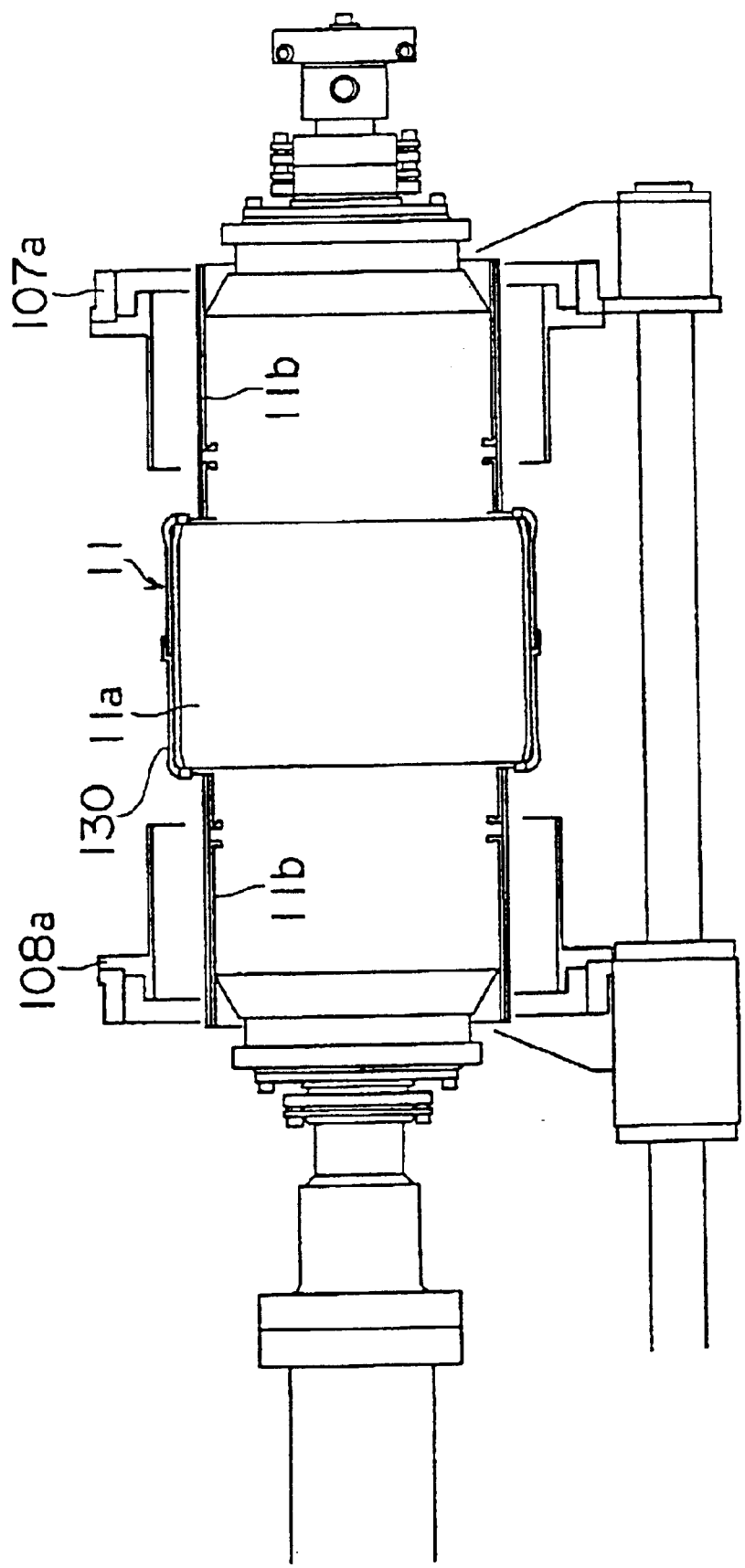
FIG. 18 is a side view showing a state in which the other rollover ring is returned to a position before turn-up.

As shown in FIG. 18, the air in the turn-up bladder 11b on the second rollover ring side is exhausted, by which the turn-up bladder 11b is contracted and is returned to the original shape, and the second rollover ring 108a returns to the previous position. Thereafter, the second rollover ring 108a returns to the standby position, returning to the state shown in FIG. 11. Thus, the turn-up is finished.

The above is a description of an embodiment of the present invention. Needless to say, the present invention is not limited to the above-described embodiment, and various changes and modifications can be made based on the technical concept of the present invention.

For example, although the X—X axis and the Y—Y axis are at right angles in the above-described embodiment, the configuration is not limited to this. Also, the turning is not limited to the turning around the point D. The configuration may be such that the X—X axis and the Y—Y axis are disposed in parallel, and the housing 10 reciprocate in parallel between both of the axes.

INDUSTRIAL APPLICABILITY

According to the radial tire forming apparatus in accordance with the present invention, since the carcass band forming former that is capable of being expanded and contracted and takes a substantially cylindrical shape at the time of forming is constructed, when a thin-wall inner liner and a ply are assembled, the stiffness is high, and these materials can be wound exactly and pressed firmly on a flat surface.

Also, the radial tire forming apparatus includes the thin-wall, ring-shaped first and second rollover rings that are disposed coaxially with the axis of forming former in the carcass forming process, and when the rollover rings are brought close to the center of the forming former, in the first half of the approaching operation, the rollover rings are brought close to the forming former synchronously and are stopped once at a respective "first advance stop position", and in the second half of the operation, either one of the rollover rings is advanced to a "second advance stop position (work finish position)", and at an appropriate time during the retreat, the other rollover ring is advanced to the "second advance stop position" of that ring, by which rollover work can be performed alternately. Therefore, the invention can be applied to the formation of a carcass band having a large folding length, especially, a tire constructed so that the fold end portions are lapped on each other at the tire equator position.

What is claimed is:

1. A radial tire forming apparatus comprising:

first forming means for forming a carcass structure, comprising carcass band forming means in which a band forming former for forming a carcass band is provided, and an inner liner and a ply are laminated on said band forming former, by which a carcass band with an outside diameter smaller than the inside diameter of a bead core is formed; carcass forming means provided with a carcass forming former with a diameter smaller than the inside diameter of carcass band formed by the carcass band forming former and a rollover device for folding and wrapping the bead core; and carcass band conveying means for reciprocating said carcass band between said carcass band forming means and said carcass forming means;

second forming means operative to wind a sidewall on said carcass structure completed by said first forming means in order to complete a green case; and third forming means operative to provide said green ease with a toroidal shape and thereafter to assemble a belt-tread structure, said third forming means including a shaping former for providing said green case with a toroidal shape, green case conveying means for receiving, conveying, and delivering said green case; belt-tread structure forming means; and belt-tread conveying means for conveying said belt-tread structure from a belt-tread forming former to a shaping former, wherein said rollover device comprises a frame on guide rails disposed in parallel with the forming former axis of said carcass forming means and moving longitudinally toward said carcass forming former; a driving unit for said frame; a guide shaft capable of moving longitudinally with said frame toward said carcass forming former disposed in parallel with said carcass forming former axis; a thin-wall, ring-shaped first rollover ring which is fixed at the end on the former side of said guide shaft and is disposed coaxially with said carcass forming former axis; and a thin-wall, ring-shaped second rollover ring which is mounted so as to be movable on said guide shaft and disposed coaxially with said carcass forming former axis, said rollover device being constructed so that said first and second rollover rings can be moved individually and synchronously, and further constructed to be mounted in a housing portion for supporting said carcass forming former, whereby said carcass forming former reciprocates between said second forming means and said first forming means, so that work for folding and wrapping the bead core of said rollover ring can be performed even during the movement of said carcass forming former.

2. The radial tire forming apparatus according to claim 1, wherein for a tire constructed so that the fold end portions of carcass band are lapped on each other, when said first rollover ring and second rollover ring are brought close to the center of said forming former, in the first half of operation, said rollover rings are brought close to said forming former synchronously and are stopped once at appropriate positions, and in the second half of operation, either one of said rollover rings is advanced to a work finish position, and at an appropriate time during the retreat, the other rollover ring is advanced to the work finish position of that rollover ring, by which rollover work is performed alternately.

3. The radial tire forming apparatus according to claim 1, wherein the diameters of said rollover rings are different from each other so that when said first rollover ring and second rollover ring are brought closest to each other, the cylindrical portions of said rings enter and lap on each other.

* * * * *